United States Patent [19]
Gordon et al.

[11] Patent Number: 5,249,825
[45] Date of Patent: Oct. 5, 1993

[54] AIR BAG WITH RELEASABLE TETHERS

[75] Inventors: John E. Gordon, Vandalia; Robert E. Huffman, Tipp City, both of Ohio

[73] Assignee: General Motors Corporation, Detroit, Mich.

[21] Appl. No.: 911,654

[22] Filed: Jul. 13, 1992

[51] Int. Cl.⁵ ............................................. B60R 21/16
[52] U.S. Cl. .................................... 280/743; 280/728
[58] Field of Search ......... 280/743, 728, 730, 743 RS, 280/743 A, 728 R, 730 R, 728 A; 188/376

[56] References Cited

U.S. PATENT DOCUMENTS

| | | | |
|---|---|---|---|
| 3,831,972 | 8/1974 | Allgaier et al. | 280/730 |
| 3,879,056 | 4/1975 | Kawashima | 280/743 |
| 4,887,842 | 12/1989 | Sato | 280/730 |
| 5,033,771 | 7/1991 | Miyauchi et al. | 280/728 |

FOREIGN PATENT DOCUMENTS

| | | | |
|---|---|---|---|
| 3-67749 | 3/1991 | Japan | 280/730 |

Primary Examiner—Karin L. Tyson
Attorney, Agent, or Firm—Charles E. Leahy

[57] ABSTRACT

A vehicle air bag module mounted on a vehicle steering column comprises a container containing an inflator and an air bag folded on top. The air bag has a fabric body, a gas inlet surrounding the inflator, and a crown located opposite the gas inlet. The outer ends of four tethers are equally spaced about the center of the crown and are sewn to it. The inner ends of the tethers are clamped to the casing of the inflator and held by frictional force. Upon inflation, the periphery of the air bag deploys to its full breadth as the tethers restrain deployment of the air bag center. After inflation pressure builds, the force exerted on the air bag crown overcomes the frictional force holding the tether inner ends, which will release, enabling the entire air bag to fully inflate. In a modification, the tethers are all sewn to the upper portion of the air bag crown to delay deployment of the upper part of the air bag until the lower part has deployed.

12 Claims, 4 Drawing Sheets

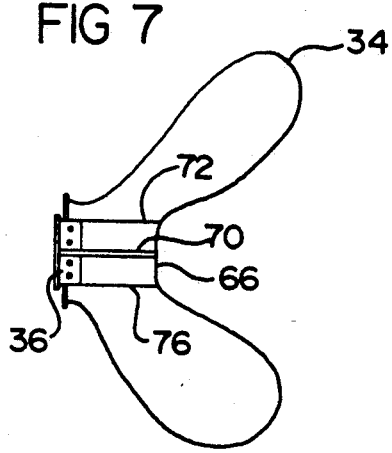
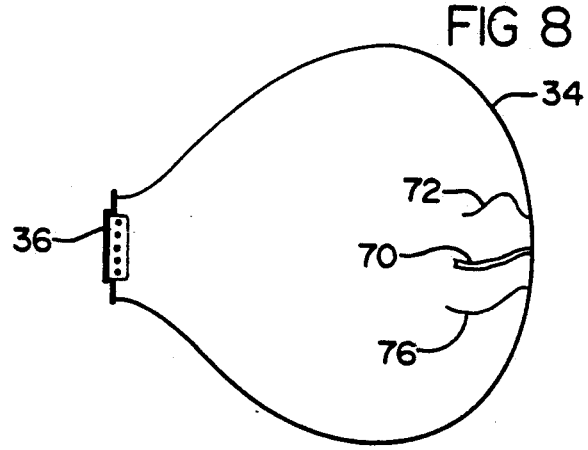
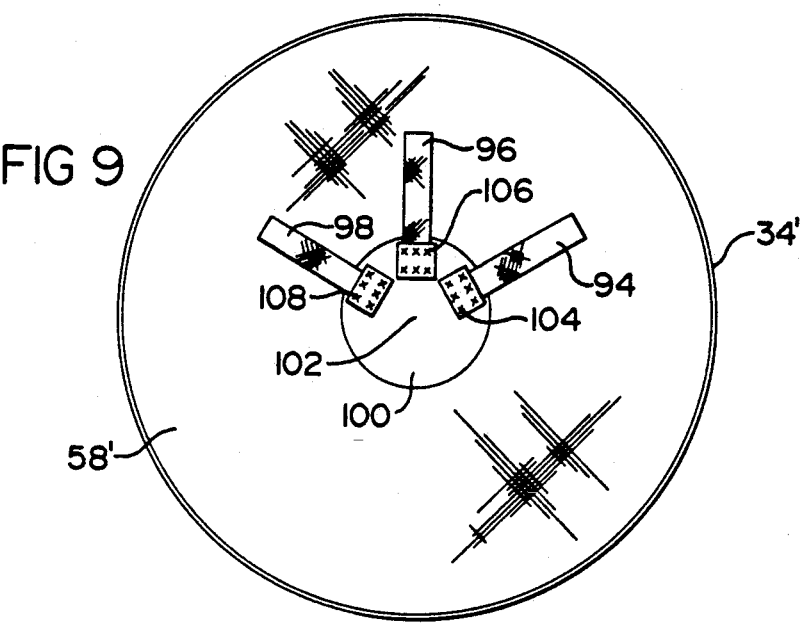
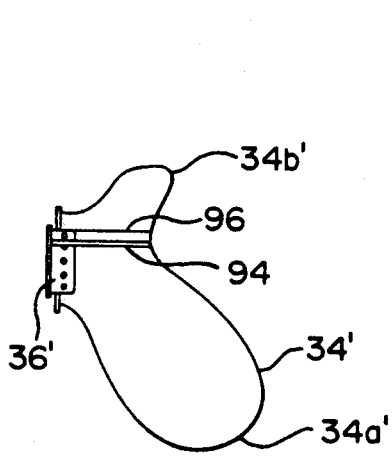
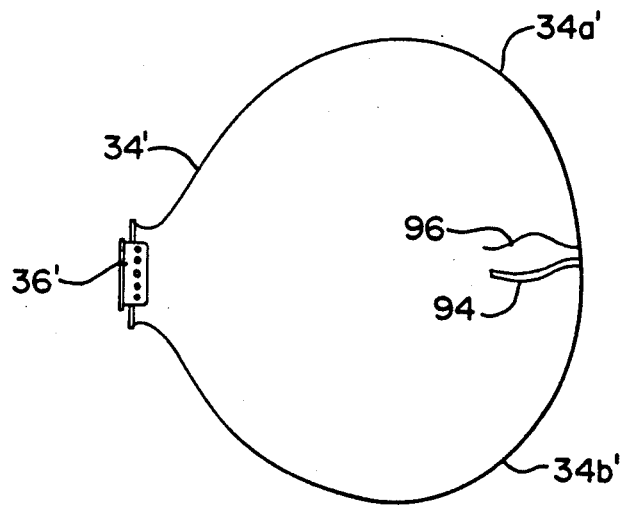

AIR BAG WITH RELEASABLE TETHERS

BACKGROUND OF THE INVENTION

This invention relates generally to vehicle air bags and, more particularly, to vehicle air bags having internal tethers for controlling air bag deployment.

Driver-side air bags have become quite common recently. These air bags are typically stored within the hub of the vehicle steering wheel and deploy to the shape of a flattened sphere. Since the air bag deploys from such a small storage space, it is desirable to assure that the air bag deploys to its full diametral dimension, or as broadly as possible, to cushion the vehicle driver.

Many driver-side air bags are provided with internal so-called "suspension belts", or tethers, to assure full breadth of deployment. These tethers comprise strips of webbing sewn to the air bag about its gas inlet and to the crown of the air bag body opposite the inlet. These tethers are provided to restrain rearward movement of the center of the air bag, thus assuring that the sides of the air bag will deploy.

Such arrangements are disclosed in U.S. Pat. No. 4,887,842—Sato and U.S. Pat. No. 5,033,771—Miyauchi et al. The Miyauchi patent is directed to providing a tether attachment which assures that the sewn attachments cannot break so that the center of the air bag cannot deploy further rearward toward the occupant.

All air bags for vehicle occupants, whether provided for drivers or passengers, are designed for use in conjunction with conventional seat belt systems. As such, they are normally designed to deploy to engage and cushion a normally seated and belted occupant. However, it has been found that some vehicle occupants fail to utilize the seat belt systems provided. In this instance, it is possible for the deploying air bag to prematurely contact a vehicle occupant who has moved out of the normal seated and belted position.

In this instance, it is desirable that the air bag quickly be deployed as broadly as possible to provide contact by the occupant with a full-width air bag. It is also desirable to assure initial downward deployment of the air bag to assure contact with the lower torso of the occupant.

SUMMARY OF THE INVENTION

It is therefore an object of this invention to provide an air bag which deploys as broadly as soon as possible to provide contact with a full-width air bag by the occupant.

Another object of this invention is to provide an air bag which initially deploys downward to assure contact with the lower torso of the occupant.

In one aspect, this invention features a vehicle air bag assembly mounted on a vehicle structure which has an inflator for inflating an air bag from a folded condition, adjacent said structure, to a fully deployed condition, located rearwardly of the structure. The air bag comprises a fabric body, a gas inlet in the body surrounding the inflator for receiving pressure gas therefrom to inflate the air bag, and a crown having a center on the body located opposite the gas inlet. A plurality of tethers each has an outer end attached to the crown and an inner end attached to the vehicle structure. Tether release means are provided for releasing one of the end attachments of each of the tethers when pressure gas has exerted a predetermined release force on the crown during inflation. This delays deployment of a portion of the air bag until after deployment of the remainder of the air bag, while enabling eventual full deployment of the entire air bag.

In another aspect, this invention features tether release means which releasably clamp the inner ends of the tethers to the vehicle structure with predetermined frictional forces which sum to total the predetermined release force.

Preferably, the inner ends of the tethers are clamped between the inflator and the vehicle structure with predetermined frictional forces which sum to total the predetermined release force.

In yet another aspect, this invention features an air bag in which the outer ends of the tethers are secured to the crown in a pattern equally spaced about its center to delay deployment of the central portion of the air bag until after substantially equal deployment of the remainder of the air bag.

In still another aspect, this invention features an air bag in which the outer ends of the tethers are attached to the crown on the top side of its center to delay deployment of the top of the air bag until after deployment of the bottom of the air bag.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 7 is a vertical sectional view of the air bag of FIG. 5;

FIG. 8 is a vertical sectional view of the air bag of FIG. 6;

FIG. 9 is a transverse sectional view of an air bag having a modified form of tether attachment to the air bag crown according to this invention;

FIG. 10 is a vertical sectional view of the air bag of FIG. 9, shown during inflation, showing the tethers attached to the inflator prior to their release and showing early deployment of the bottom of the air bag; and FIG. 11 is a view similar to FIG. 5, but showing the tethers released from the inflator at full air bag inflation;

DETAILED DESCRIPTION OF A PREFERRED EMBODIMENT

Figure 1:
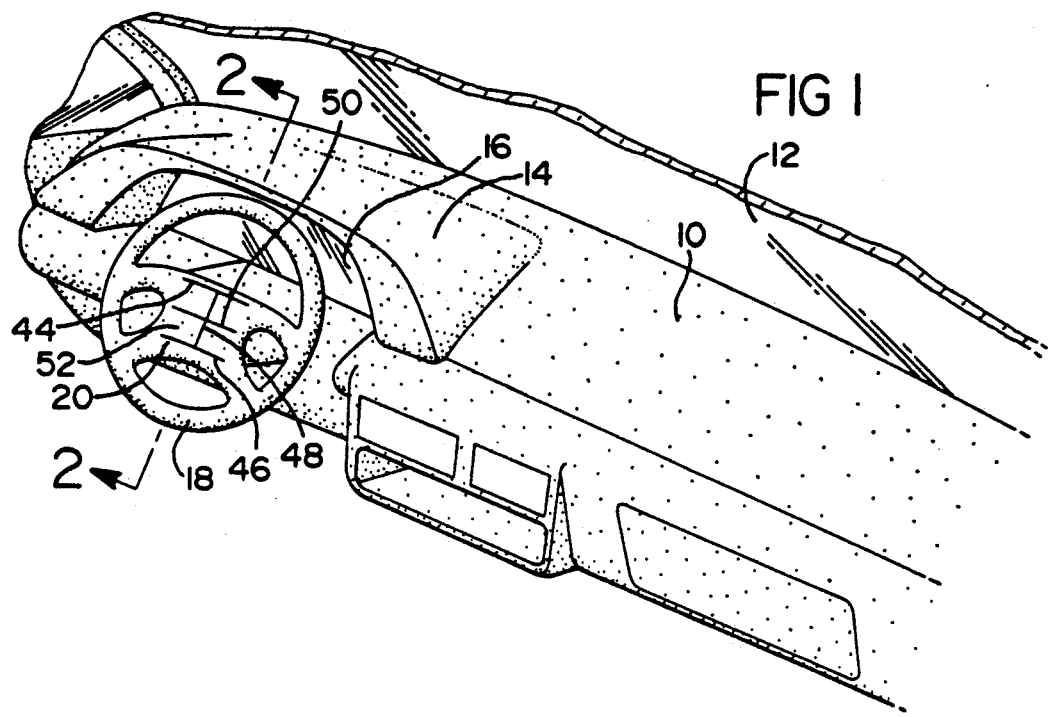
FIG. 1 is a partial perspective view of a vehicle interior, illustrating a steering wheel which incorporates an air bag module according to this invention.

Referring now to FIG. 1 of the drawings, a passenger vehicle interior includes an instrument panel 10 mounted behind a windshield 12. Instrument panel 10 includes a shroud 14 which covers an instrument cluster 16 in front of the left, or driver's, seating position in the vehicle. A steering wheel 18 projects from instrument panel 10 and includes a hub portion 20.

Figure 2:
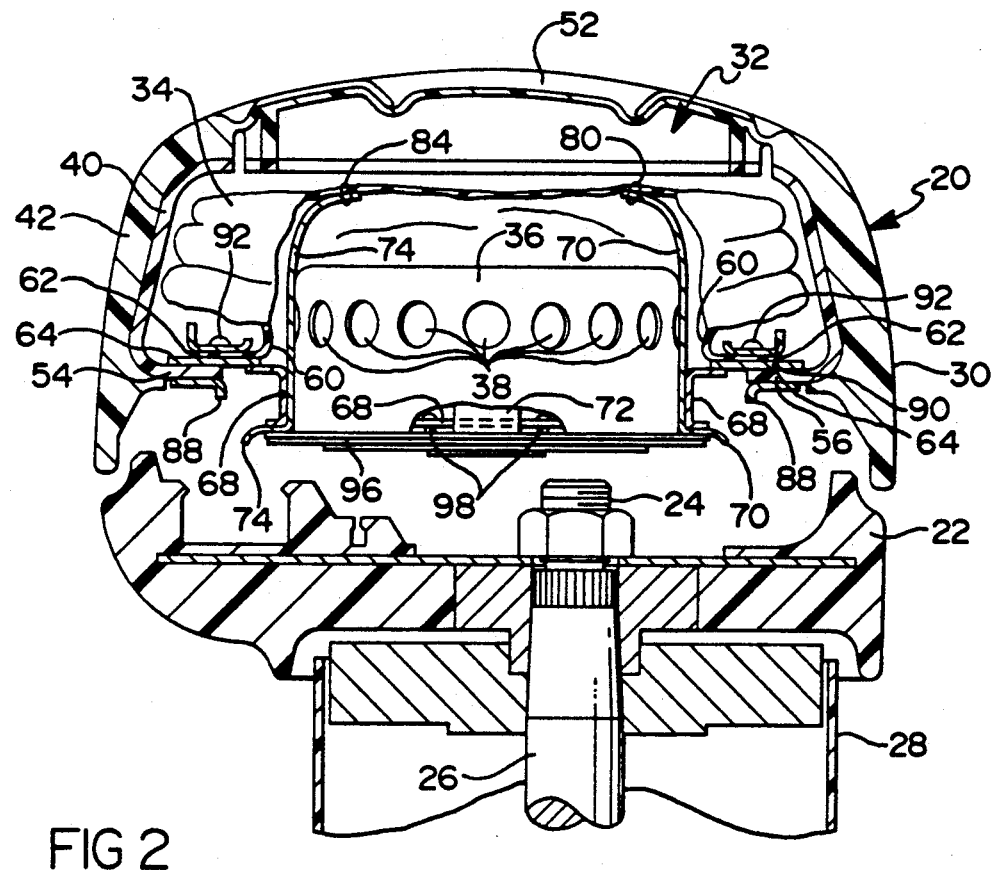
FIG. 2 is an enlarged sectional view, taken along line 2—2 of FIG. 1.

As shown in FIG. 2, steering wheel hub 20 includes a base 22 that is secured by a bolt 24 to a steering shaft 26 which is shrouded by a steering column 28. Hub 20 further includes an air bag module comprising a container 30 which covers an air bag assembly 32. The air bag assembly includes an inflatable air bag 34 which is folded atop a circular inflator 36 that has spaced gas discharge holes 38 which communicate with the interior of air bag 34.

Figure 4:
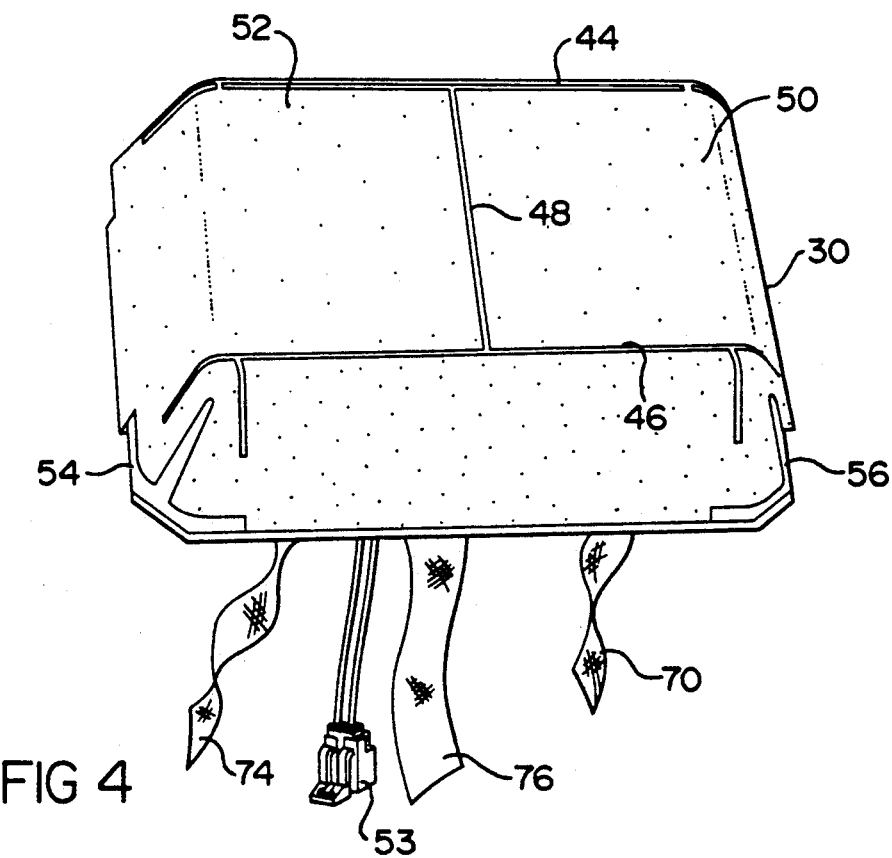
FIG. 4 is a perspective view of an air bag module according to this invention.

Container 30 is a unitary member comprising a resilient thermoplastic substrate 40 having a urethane foam covering 42. As shown in FIGS. 2 and 4, foam covering has a superficial design in an "I" pattern, comprising surface grooves forming leg segments 44 and 46, and a cross bar 48. These grooves provide tear lines which define door segments 50 and 52 that are forcibly opened by deployment of the air bag 34 upon inflation by inflator 36 in a well-known manner. Inflator 36 includes electrical wiring and connector 53 for connection to a vehicle electrical actuation circuit (not shown) upon installation in a vehicle. The base of container 30 includes spaced mounting flanges 54 and 56 for mounting inflator 36, air bag 34 and container 30 to base 22, as later described.

Figure 3:
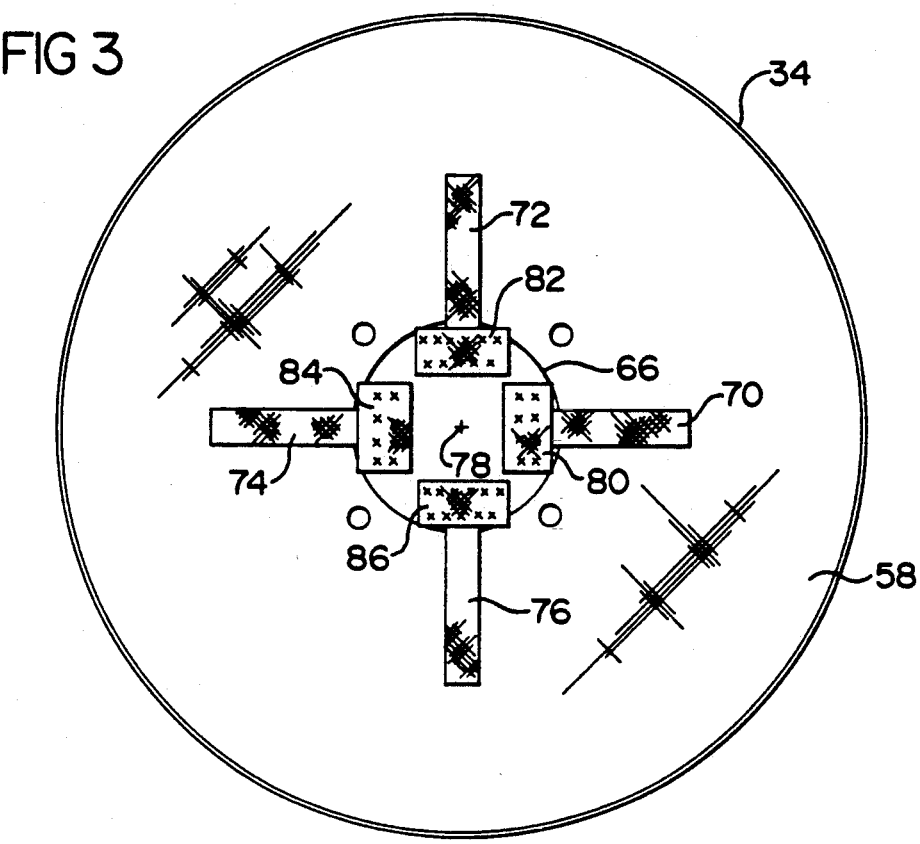
FIG. 3 is a transverse sectional view of an inflated air bag having a preferred form of tether attachment to the air bag crown according to this invention.

Referring now to FIG. 3, air bag 34 comprises a plurality of panels sewn together to form a slightly porous fabric body 58 having a generally spherical shape. Air bag 34 includes a circular gas inlet 60, defined by a hem 62 which is sewn to a mounting ring 64 (FIG. 2). Opposite inlet 60 is a circular crown 66. Four equally-spaced tethers 70, 72, 74 and 76, made of fabric webbing, are equally spaced about the center 78 of crown 66 at 80, 82, 84 and 86.

Figure 5:
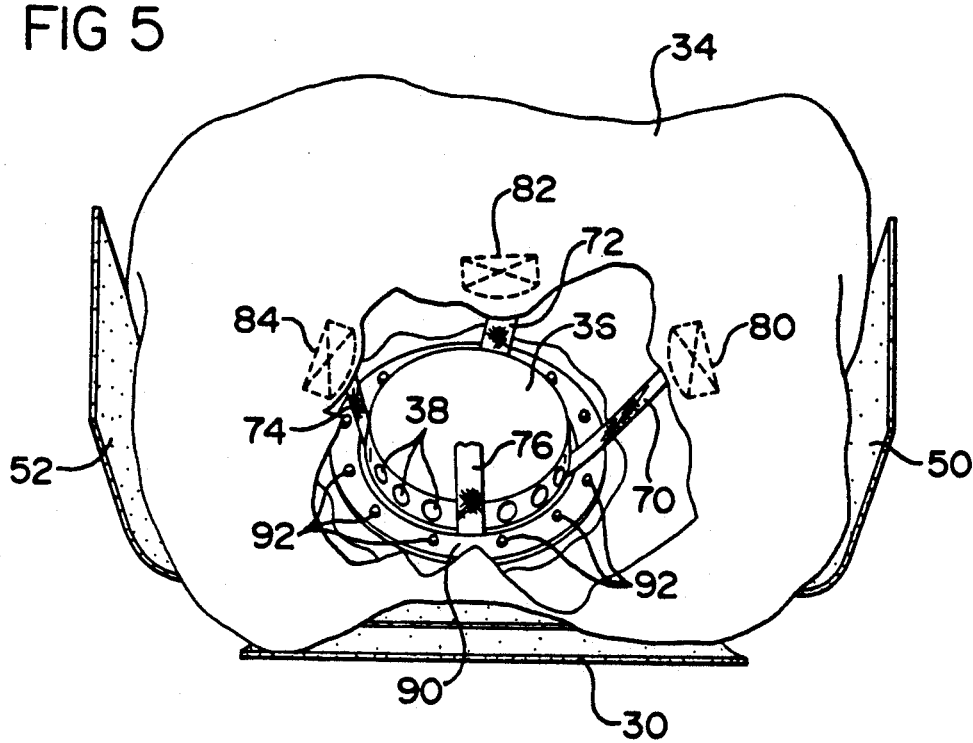
FIG. 5 is a perspective view of the air bag of FIG. 3, shown during inflation and partially broken away to show the tether attachment to the inflator prior to their full release.

As shown in FIGS. 2 and 5, air bag mounting ring 64, container mounting flanges 54 and 56, and annular inflator mounting ring 68 are clamped between a circular flange 88 mounted on hub base 22 and a circular mounting flange 90, by a plurality of rivets 92. The inner ends of tethers 70, 72, 74 and 76 are trained between the casing of inflator 36 and mounting ring 68 and are clamped by fasteners 94 which connect bottom flange 96 of inflator 36 to mounting ring 68. The inner ends of the tethers are maintained attached to the vehicle structure between inflator 36 and mounting ring 68 by equal frictional forces.

Upon ignition of inflator 36, pressure gas will begin inflating air bag 34. The force exerted by inflating air bag 34 will tear foam cover 42 along the tear lines 44, 46 and 48 to force doors 50 and 52 open. Air bag 34 will then begin deploying outwardly of container 30. Tethers 70, 72, 74 and 76 will restrain deployment of the center of air bag 34, as shown in FIG. 7. This enables the peripheral portions of air bag 34 to deploy to the full diametral extent, or breadth, of the air bag.

Figure 6:
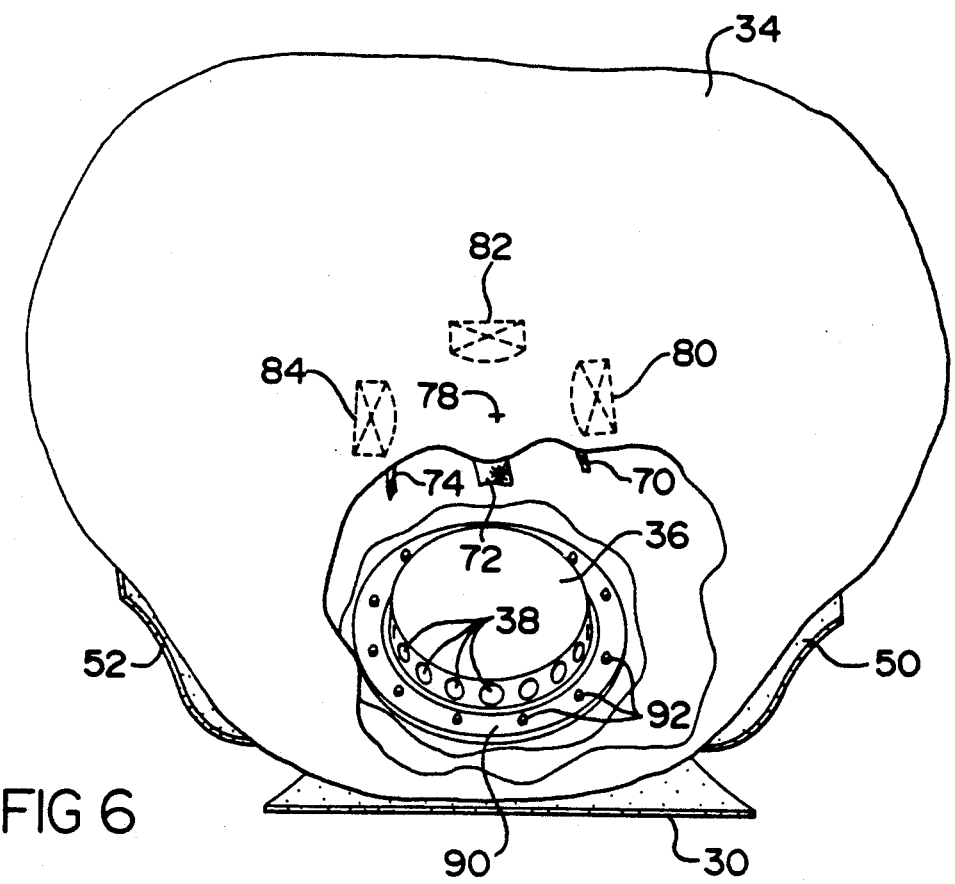
FIG. 6 is a view similar to FIG. 5, but showing the tethers released from the inflator at full air bag inflation.

The force exerted on crown 66 will overcome the sum of the frictional forces on tethers 70, 72, 74 and 76 and the tethers will begin escaping their clamped attachment, as shown in FIGS. 5 and 7. Ultimately, the inflating force of the pressure gas on air bag 34 will free the tethers and the center of air bag 34 will fully deploy, as shown in FIGS. 6 and 8. This fully inflated deployment will continue until inflator 36 shuts down, usually 100-120 milliseconds after ignition, and air bag 34 will begin deflating upon gas escape due to the porosity of the air bag fabric and/or through vent holes (not shown).

A modified form of the invention is illustrated in FIGS. 9-11, wherein elements identical to those in the FIGS. 3 and 5-8 embodiment have the same reference numeral, but primed. In this modification, air bag 34' has a body 58' that has three closely spaced tethers 94, 96 and 98 sewn to the top part of crown 100 in a lopsided pattern above its center 102 at 104, 106 and 108, respectively. The inner ends of tethers 94, 96 and 98 are clamped about inflator 36', as in the previous embodiment, but in the same lopsided pattern as the crown, as illustrated in FIG. 10.

Upon inflation, air bag 34' will deploy as indicated in FIG. 10, with initial deployment of the lower part of the air bag 34a' ahead of the upper part 34b'. This unbalanced deployment is caused by the frictional attachment of tethers 94, 96 and 98 about inflator 36', which restrains the upper part 34b'. After sufficient gas pressure builds up, tethers 94, 96 and 98 release and air bag 34' fully deploys, as shown in FIG. 11

Since the tethers are contained within the air bag at all times in both embodiments, they present no safety hazard after release from their clamping engagement about the inflator. Preferably, and for the sake of simplicity, all tethers are clamped with the same frictional force.

The addition of the tethers to the driver-side air bag module illustrated does not unduly complicate assembly of the module. The procedure is to sew longer-than-needed tethers to the said bag crown, fold the air bag, hang the tethers through the mounting plate, insert the inflator, snug the tethers, clamp in place, and cut the free tether ends to length.

As an alternative to the FIGS. 9-11 embodiment, various portions of the air bag could be delayed in their deployment by varying the release of the tethers. This could be accomplished by varying the sew pattern of the tethers, or by varying the frictional force attaching the tethers about the inflator. This latter arrangement could occur through varying tether width or by varying the force clamping the individual tethers.

As an alternative to the clamping arrangements illustrated, the inner ends of the tethers could be secured and the outer ends could be sewn to the air bag crown with stitching that would rupture and free the outer ends upon the pressure gas exerting the predetermined release force. The strength of the stitch attachments of the tethers could also be varied to vary the time of release of each tether.

While only a preferred and a modified embodiment have been illustrated and described, obvious modifications thereof are contemplated within the scope of this invention and the following claims.

We claim:

1. In a vehicle air bag assembly mounted on a vehicle structure and having an inflator for inflating an air bag from a folded condition, adjacent said structure, to a fully deployed condition, located rearwardly of the structure, an air bag comprising a fabric body, a gas inlet in the body surrounding the inflator for receiving pressure gas therefrom to inflate the air bag, a crown on the body located opposite the gas inlet and having a center, a plurality of tethers each having an outer end secured to the crown and an inner end, friction clamping engagement means for releasably attaching the inner ends of the tethers to vehicle structure adjacent the gas inlet for release therefrom when pressure gas has exerted a predetermined release force on the crown during inflation, thus delaying deployment of a portion of the air bag until after deployment of the remainder of the air bag, while enabling eventual full deployment of the entire air bag.

2. The air bag of claim 1 wherein the friction clamping engagement means is provided by an annular mounting ring surrounding the inflator and clamping the inner ends of the tether against the inflator.

3. The air bag of claim 2, wherein the friction clamping engagement means releasably clamp the inner ends of the tethers between the inflator and the vehicle structure with predetermined frictional forces which sum to total said predetermined release force.

4. The air bag of claim 3, wherein the outer ends of the tethers are secured to the crown in a pattern equally spaced about its center to delay deployment of the central portion of the air bag until after substantially equal deployment of the remainder of the air bag.

5. The air bag of claim 3, wherein the outer ends of the tethers are attached to the crown on one side of its center to delay deployment of that side of the air bag until after deployment of the other side of the air bag.

6. The air bag of claim 3, wherein the outer ends of the tethers are attached to the crown on the top side of its center to delay deployment of the top of the air bag until after deployment of the bottom of the air bag.

7. The air bag of claim 3, wherein the outer ends of the tethers are secured to the crown in a pattern unequally spaced about its center to delay deployment of one or more portions of the air bag until after deployment of other portions of the air bag.

8. The air bag of claim 3, wherein all tethers are clamped with equal frictional forces.

9. The air bag of claim 3, wherein all tethers are not clamped with equal frictional forces to regulate the deployment of various portions of the air bag.

10. In a vehicle air bag assembly mounted on a vehicle structure and having an inflator for inflating an air bag from a folded condition, adjacent said structure, to a fully deployed condition, located rearwardly of the structure, an air bag comprising a fabric body, a gas inlet in the body surrounding the inflator for receiving pressure gas therefrom to inflate the air bag, a crown on the body located opposite the gas inlet and having a center, a plurality of tethers each having an outer end attached to the crown and an inner end, and means for frictionally clamping the inner ends of the tethers against the inflator and for releasing the inner end of each of the tethers when pressure gas has exerted a predetermined release force on the crown during inflation, thus delaying deployment of a portion of the air bag until after deployment of the remainder of the air bag, while enabling eventual full deployment of the entire air bag.

11. The air bag of claim 10 wherein the means for frictionally clamping is an annular ring and the inflator has a bottom flange and the annular ring clamps the inner end of the tethers against the bottom flange.

12. The air bag of claim 11 wherein the inflator is cylindrical in shape and the annular ring surrounding the inflator frictionally clamps the inner ends of the tether against the circumference of the cylindrical inflator.

* * * * *